(No Model.)

W. A. SAWYER.
MACHINE FOR MEASURING THE AREA OF SURFACES.

No. 269,962. Patented Jan. 2, 1883.

Attest:
Wm Zittel
John R. Snow

Inventor:
William A. Sawyer
by J. E. Maynadier
his atty.

(No Model.)  2 Sheets—Sheet 2.

W. A. SAWYER.
MACHINE FOR MEASURING THE AREA OF SURFACES.

No. 269,962. Patented Jan. 2, 1883.

Attest: Inventor:
William A. Sawyer
John R. Snow by J. E. Maynadier
his Atty.

UNITED STATES PATENT OFFICE.

WILLIAM A. SAWYER, OF DANVERSPORT, ASSIGNOR OF TWO-FIFTHS TO ARTHUR B. CLAFLIN, OF NEWTONVILLE, MASSACHUSETTS.

MACHINE FOR MEASURING THE AREA OF SURFACES.

SPECIFICATION forming part of Letters Patent No. 269,962, dated January 2, 1883.

Application filed May 13, 1882. (No model.)

*To all whom it may concern:*

Be it known that I, WILLIAM A. SAWYER, a citizen of the United States, residing at Danversport, in the county of Essex and State of Massachusetts, have invented a new and useful Machine for Measuring the Area of Surfaces, of which the following is a specification.

The object of my invention is to rapidly and accurately determine the superficial area of sheets or surfaces of any kind of outlines, more particularly of hides and skins.

My invention consists in operating a registering device by means of a cord connected to mechanism which is set in motion by the sheet whose superficial area is to be ascertained.

Figure 1:
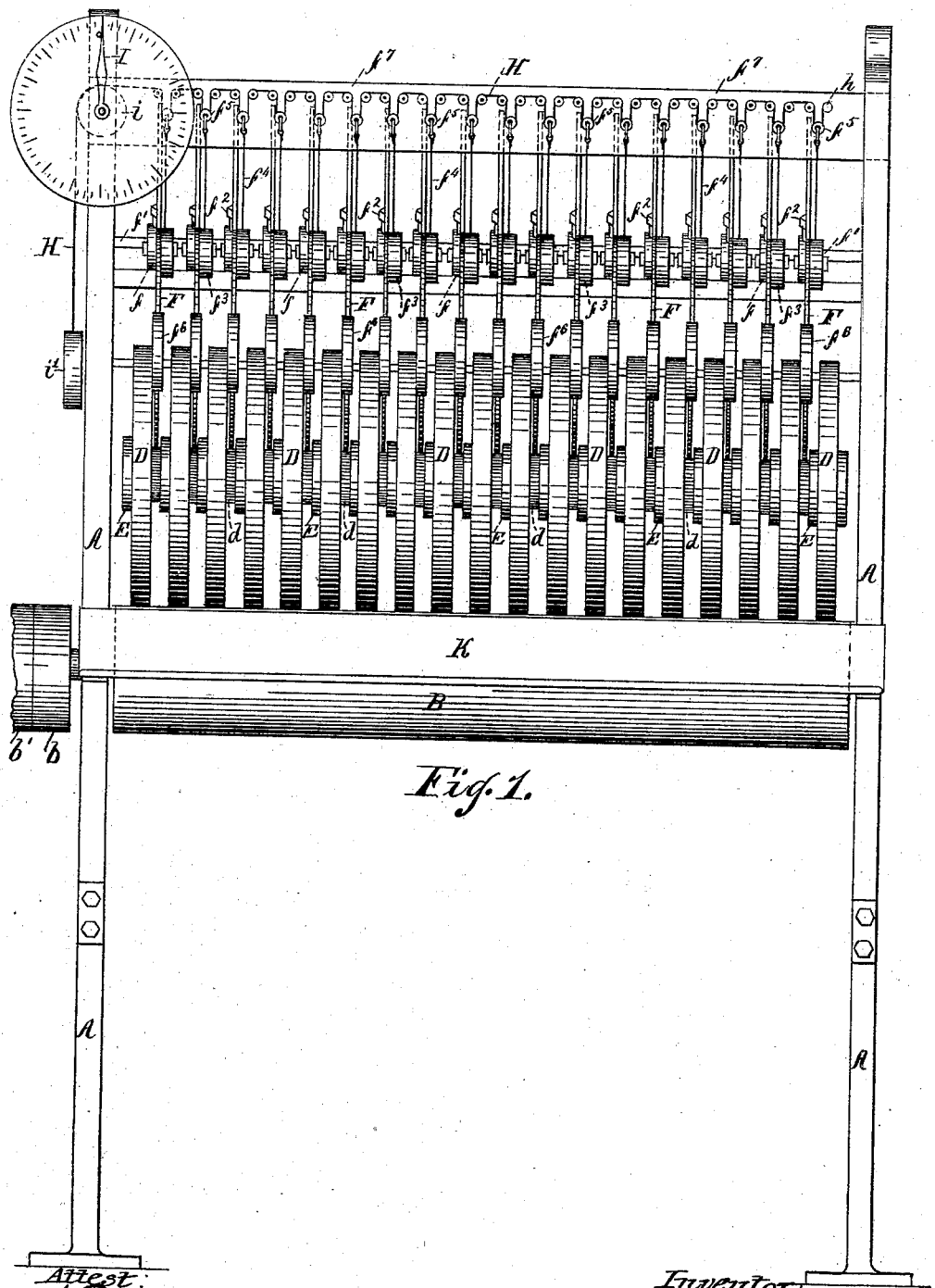
Figures 2, 3, 4:
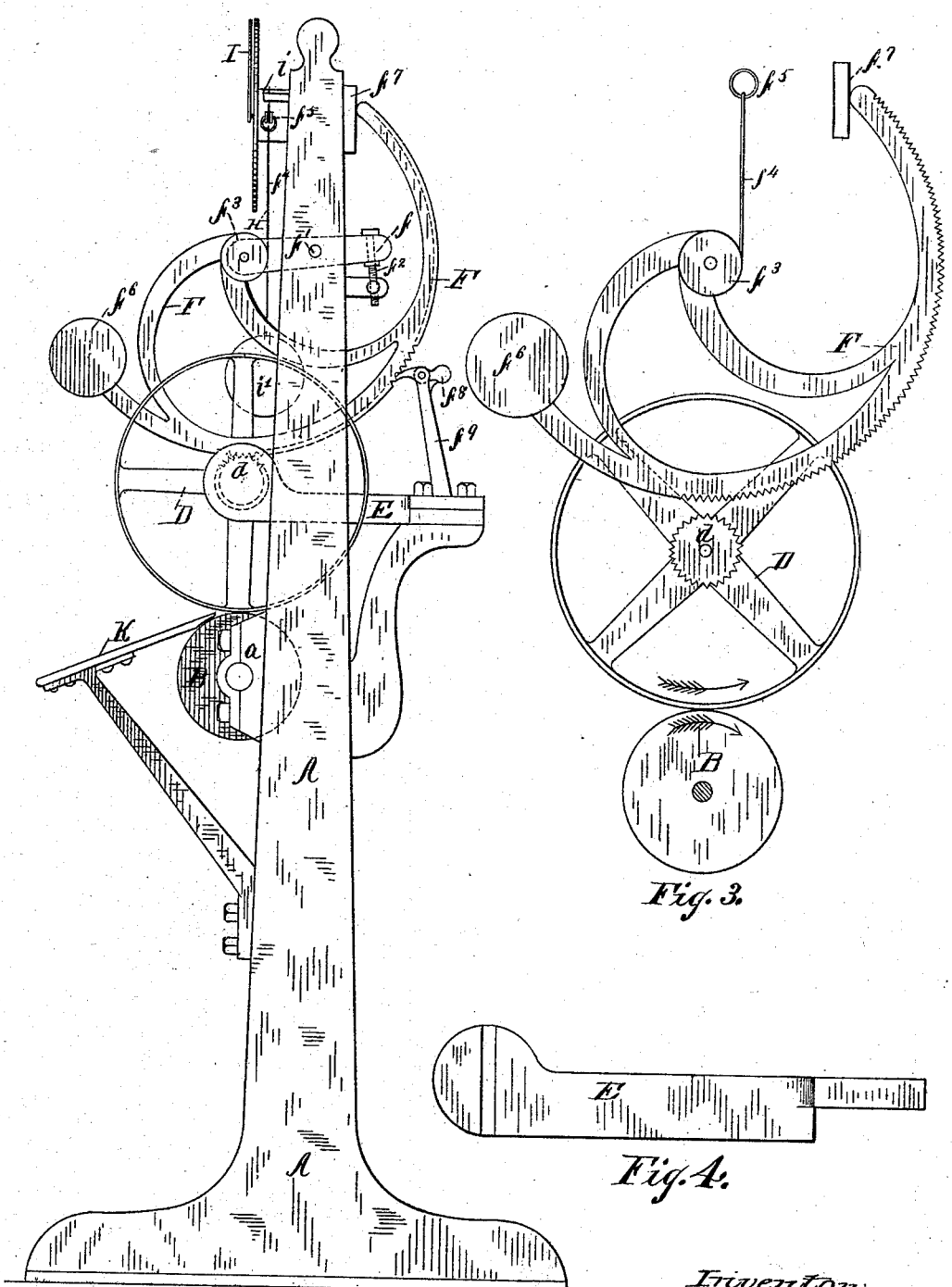

In the accompanying drawings, which illustrate my improved machine as constructed in the best way known to me, Figure 1 is a front elevation; Fig. 2, a side elevation. Fig. 3 is an enlarged elevation, partly in section, of one of the series of measuring devices. Fig. 4 is a side view of a slotted arm that forms one of the boxes for the journals of the wheels.

To a frame, A, which supports all the mechanism, are secured the boxes $a$, which receive the journals of a roller, B. The length of this roller B and the inside width of the frame A are adapted to the size of the largest sheet whose superficial area it is desired to ascertain.

The roller B is provided with tight and loose pulleys $b\ b'$, which receive a belt, by shifting which the machine may be started or stopped in the well-known way. A series of wheels, D, rest on the roller B, and are caused to revolve by contact therewith when the belt is acting on the tight pulley $b$. These wheels D have their journals in vertical slots in the sides of the arms E, near one end, as shown in Fig. 4. The other ends of these arms are securely fastened to a cross-beam on the frame A. These slots allow the wheels to rise and fall and retain their axes always in the same vertical plane. The hubs $d$ of these wheels project on one side beyond the rims, and have these projecting parts provided with cogs or teeth.

Immediately above the projecting part of each hub is a toothed segment, F, journaled in one end of a lever, $f$, which is supported by a cross-rod, $f'$, attached to the frame. These levers $f$ are mounted on the cross-rod $f'$, and have their other ends adjustably secured to a cross-beam of the frame by means of the screw-bolts $f^2$, by means of which the segments can be accurately arranged in proper relation to the toothed hubs $d$. The teeth on these hubs engage with the teeth on the segments only when the wheels are raised by the sheet to be measured being passed between them and the roller. To each of the hubs of these toothed segments F is attached a cord, $f^4$, having a ring or pulley, $f^5$, secured to its upper end. A cord, H, attached at one end, $h$, to the frame A, passes over pulleys secured to the frame through the rings or pulleys $f^5$, all the cords $f^4$ attached to the hubs of the segments having their rings or pulleys $f^5$ strung on the cord H, as shown in Fig. 1. The cord H is then passed over a pulley, $i$, on the shaft of the index-finger I, and attached to a weight, $i'$. This weight $i'$ and the friction of the cord H on the pulley $i$ tend to keep the index-finger I at the zero of the scale, a suitable stop being provided to hold the finger at that point. The weight prevents any slack in the cord, which will slip on the pulley $i$ when the index finger is against its stop, and keeps sufficient strain on all the cords to effectually prevent any lost motion. The toothed segments when free are retained in the position shown in Figs. 1 and 3 by means of weights $f^6$, attached to one extremity of the arc, and by the other end of the arc being in contact with a cross-bar, $f^7$, attached to the frame. They are retained in the positions to which they may be brought in measuring a surface by the pawls $f^8$, which engage with their teeth. These pawls are pivoted to upright arms $f^9$, and weighted to act by gravity. All the arms $f^9$ are attached to the same cross-bar, by moving which the pawls are all caused to release their respective segments at the same time and leave them free to resume their normal positions. A table, K, attached to the frame A serves to support the hide or other article as it is presented to the machine.

The operation will be readily understood by reference to Fig. 3, since each wheel may be considered an independent machine for measuring only that part of the surface which passes under it. The roller is revolved, as indicated by the arrow, and causes the wheel that rests on it to revolve as indicated by its arrow. The sheet to be measured is placed on the table and has its end inserted between the roller and wheel. The thickness of the sheet raises the wheel so as to cause the teeth in its hub to engage with the teeth on the segment, and so long as any portion of the sheet passing through is in contact with the wheel it will cause the cord to be wound on the hub of the segment, and as this cord is thereby drawn over the pulley on the shaft of the index-finger, that finger must move a corresponding distance over the graduated scale, and thereby register the number of inches of material that has been passed through the machine. By arranging a number of these wheels side by side and as close together as possible each wheel will cause a part of the cord to be drawn over the pulley, according to the length of material that passes under it, and as all the wheels draw on the same cord the surfaces measured by each will be aggregated and the total area be indicated by the index-finger and the graduated scale.

The parts are so proportioned that any desired length of material can be passed through before the segments would be run out and the weight be drawn up.

I claim as my invention—

1. In a machine for measuring the area of surfaces of any kind of outline, a registering device operated by a cord connected to mechanism which is set in motion by the sheet the area of whose surface is to be measured, substantially as described.

2. The combination, with an index-finger and a graduated scale, of a weighted cord passing over the shaft of this index-finger and connected to the hubs of toothed segments, as described, and a series of wheels having toothed hubs and resting on a roller and adapted to be raised by the passage of a skin or other article whose area is to be measured, so that their toothed hubs will engage and set in motion the toothed segments, substantially as and for the purposes set forth.

3. The combination of the graduated scale, its index-finger with a cord passing over its shaft, the toothed segments having their hubs connected to this cord, as set forth, the wheels having toothed hubs and resting on a roller, the pawls acting on the segments and adapted to be disengaged, as described, the weight attached to the cord passing over the shaft of the index-finger, and a table for supporting the article whose area is to be measured, all arranged together substantially as described, and for the purposes set forth.

WM. A. SAWYER.

Witnesses:
G. B. MAYNADIER,
JOHN R. SNOW.